Patented July 19, 1932

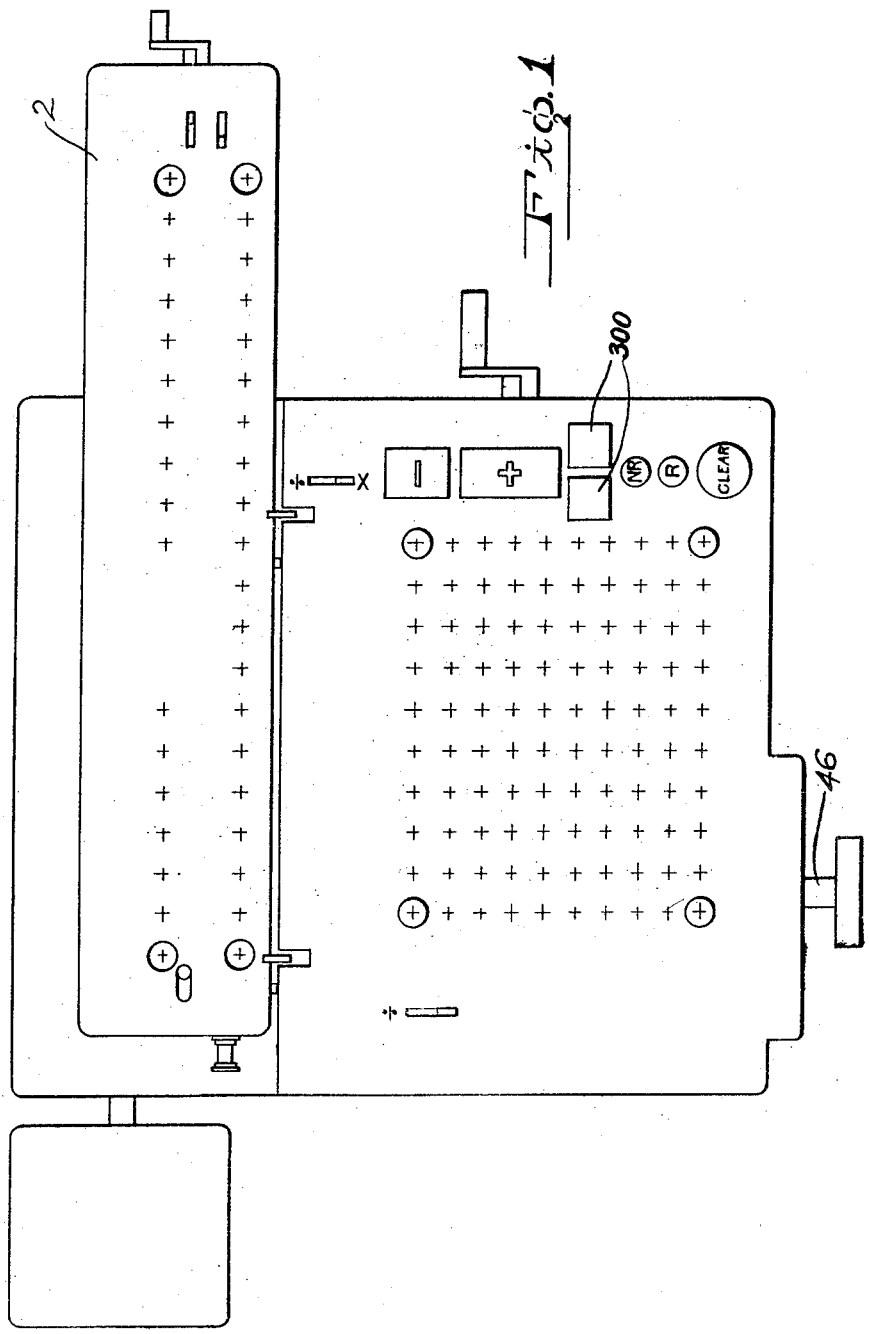

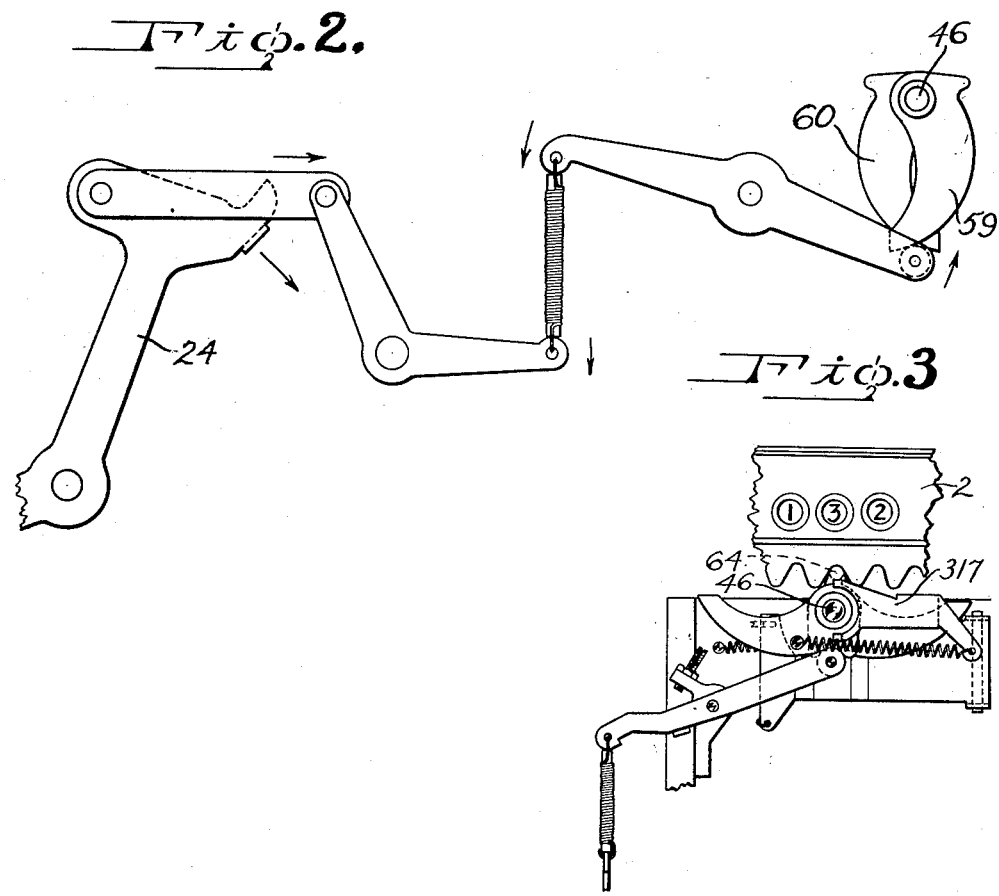

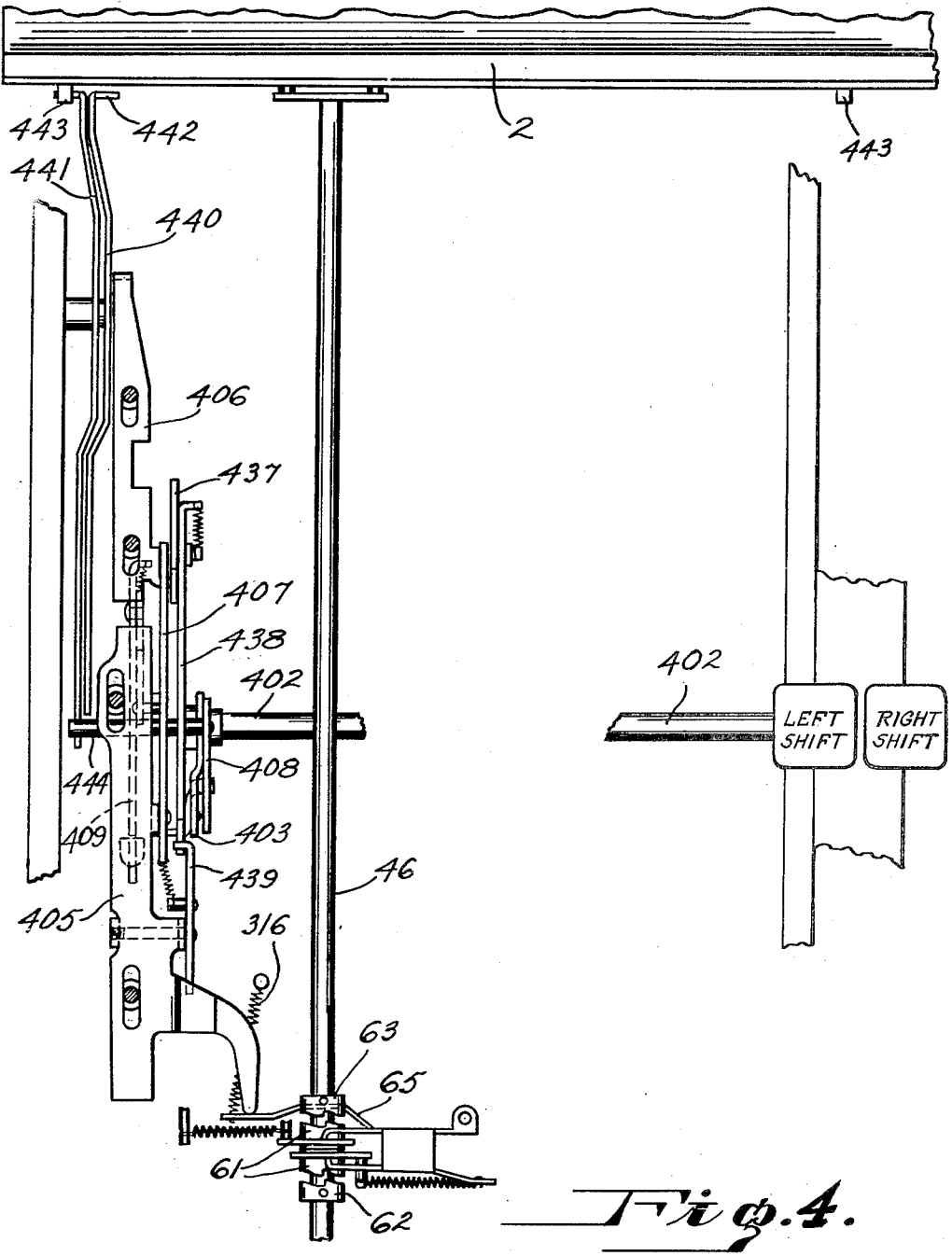

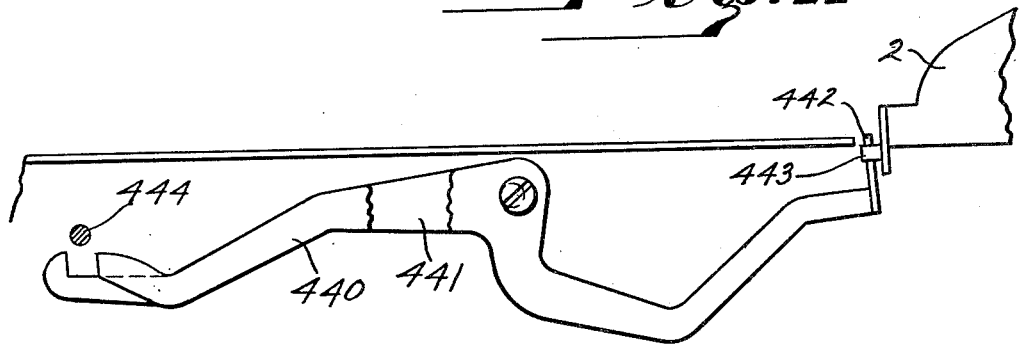
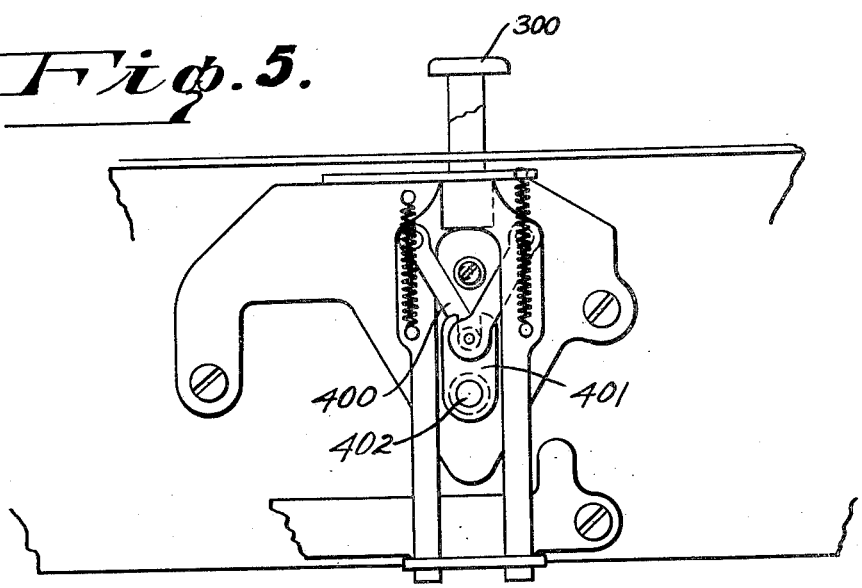

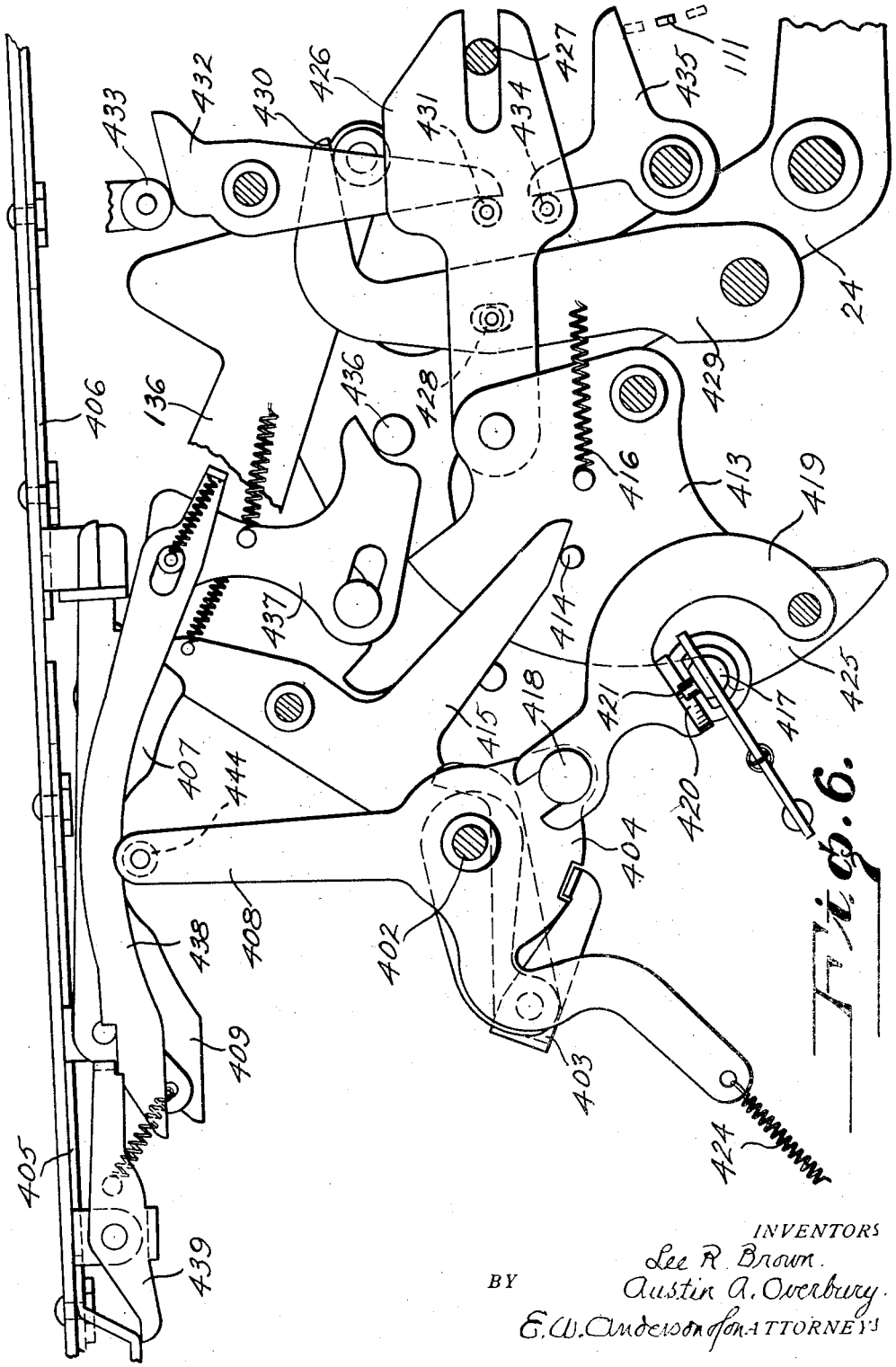

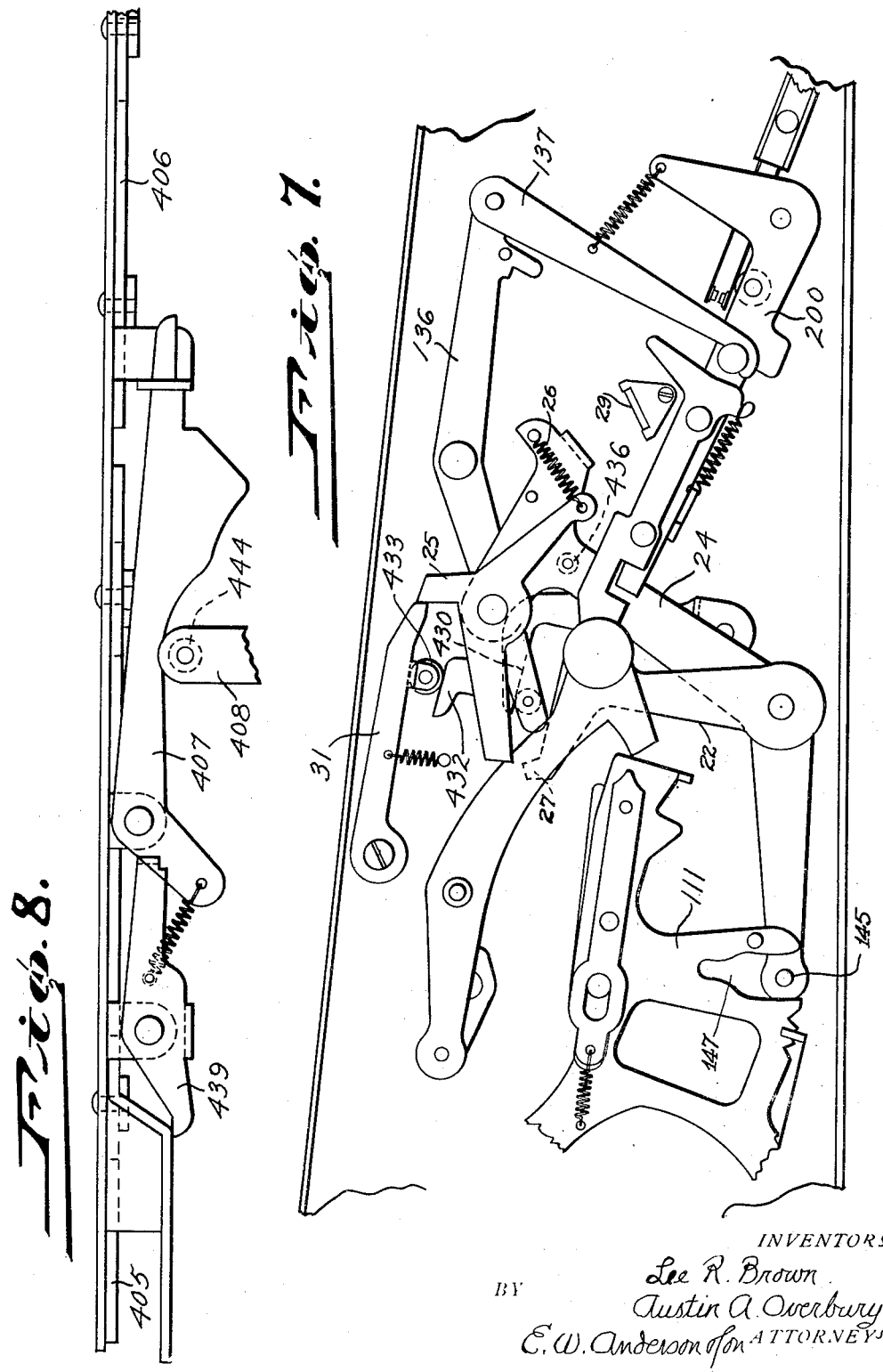

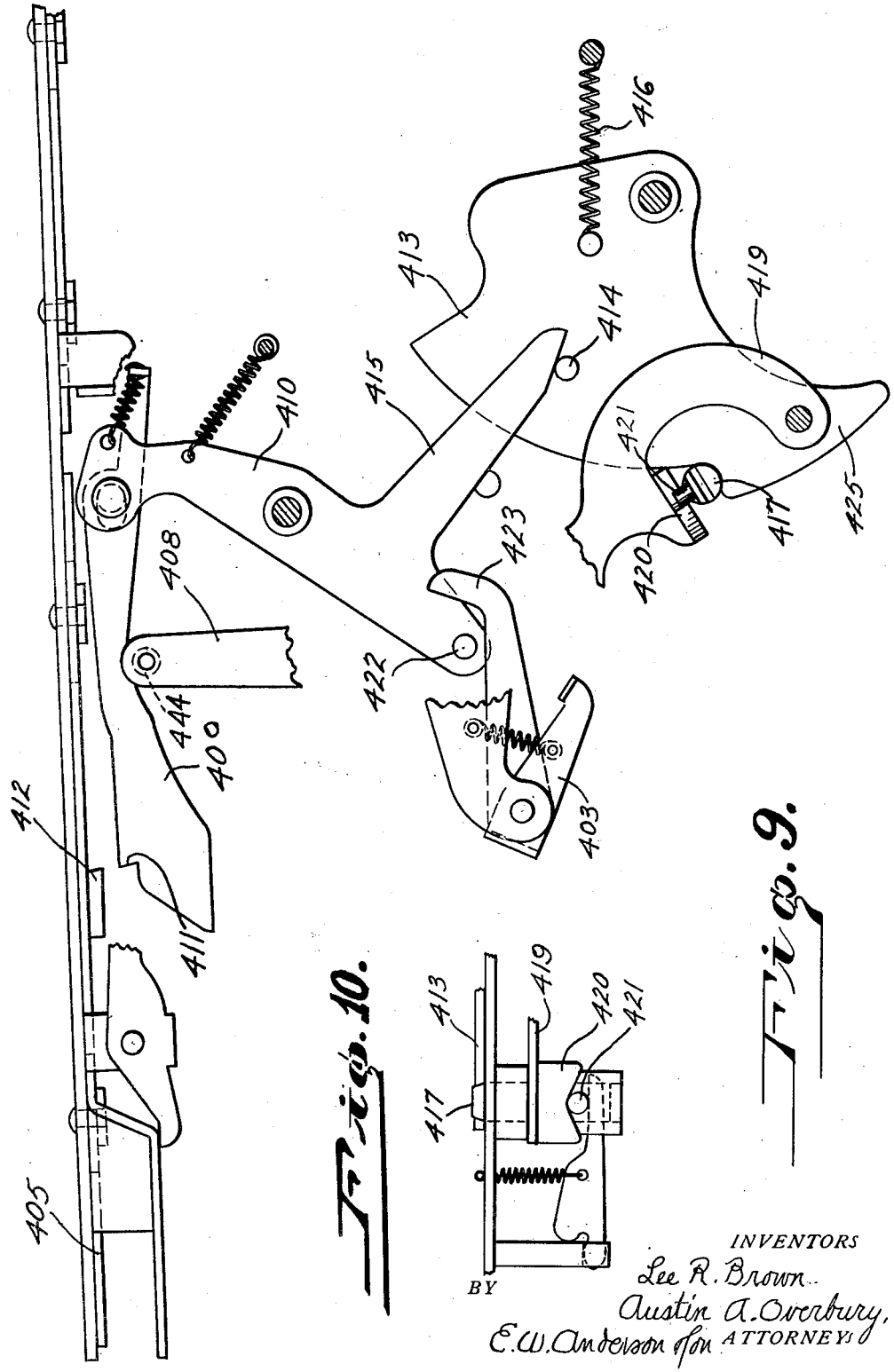

1,868,407

UNITED STATES PATENT OFFICE

LEE R. BROWN, OF EAST ORANGE, AND AUSTIN A. OVERBURY, OF WEST ORANGE, NEW JERSEY, ASSIGNORS TO MONROE CALCULATING MACHINE COMPANY, OF ORANGE, NEW JERSEY, A CORPORATION OF DELAWARE

CALCULATING MACHINE

Application filed September 24, 1930, Serial No. 484,175, and in France December 17, 1929.

The invention relates to power means for shifting the numeral wheel carriage of a calculating machine selectively toward the right or the left in response to the depression of appropriate control keys.

The invention is shown as applied to a Monroe calculating machine disclosed in its essential features in U. S. Patent Number 1,566,650 issued to George C. Chase on December 22, 1925, as modified in application Serial Number 159,155, filed January 5, 1927, and in application Serial Number 213,570, filed August 17, 1927.

The invention consists in the novel construction and combination of parts as set forth in the appended claims.

In the accompanying drawings, illustrating the invention:

Fig. 1 is a plan view of a calculating machine embodying the invention.

Fig. 2 is a diagrammatic view of levers used to transmit the shifting impulse.

Fig. 3 is a detail front elevation of the parts associated with the carriage shifting shaft, said parts being shown in position taken during a shifting operation.

Fig. 4 is a plan view of the shifting and shift control mechanism.

Fig. 5 is a side elevation of the carriage shifting keys and associated mechanism.

Fig. 6 is a right-hand elevation of the shift-control mechanism.

Fig. 7 is a left-hand elevation showing the engagement of said control mechanism with the prior art devices.

Fig. 8 is a detail elevation of the left-hand shift clutch control.

Fig. 9 is a similar view of the right-hand shift clutch control.

Fig. 10 is a detail plan view of the hammer restraining and releasing means.

Fig. 11 is a detail elevation of the means for preventing operation of a shift key when the carriage stands in extreme shifted position.

Located at the right-hand side of the machine are the right and left shift keys 300, as shown in plan view in Fig. 1, and in detail in Fig. 5.

The stems of these keys pass through the upper keyboard plate and are supported by a suitable bracket made fast to the usual lower keyboard plate. Suitable means are provided to limit the upward and downward movement of the keys, springs being provided to normally retain the keys in raised position. These keys control right and left shifting of the numeral wheel carriage 2 in the manner presently to be described, but first, attention will be directed to the known mechanisms utilized in the preferred embodiment of the invention.

Referring to the above-noted prior art devices, it will be noted that if the stop member 25, described in Patent Number 1,566,650 is released from the restraint of trigger 31, (Fig. 7) with the parts in normal position of rest, the full cycle stopping mechanism will operate (when the machine is started) to prevent the numeral wheel actuators from passing out of the zone of idle movement provided in reversible cycle machines to accommodate the tens transfer devices. It will further be noted that under these conditions, arm 24 may be utilized to transmit the shifting impulse.

Trigger lever 31, being lifted free of the stop element, 25, allows the same, by means of its spring 26 (Fig. 7), to be moved into position for engagement with the free end 27 of rock lever 22 oscillated by means of suitable driving connections with the numeral wheel actuators. Rock lever 22 carries arm 24 of the stop mechanism from normal position to position of contact with stop 29, as fully described in the Chase Patent Number 1,566,650.

Movement of arm 24 to stop 29 has imparted shifting impulse to the carriage shifting cams 59 and 60 by suitably arranged levers as diagrammatically shown in Fig. 2, the cams 59 and 60, with their clutch hubs, being rotated in opposite directions.

Pin 145 in rear arm of lever 24 has during the above mentioned movement, been raised in cam slot 147 of the clutch yoke 111 camming the same to normal position out of engagement with the motor drive.

Carriage 2 is shifted toward the right or left by the power impulse previously described, whenever one of the clutch hubs 61 of the cams 59, 60 is engaged with a co-operating clutch member 62 or 63 of shaft 46, said shaft being rotated as viewed in Fig. 3 and one of the crank pins 64 on said shaft engaging a rack on the front edge of the carriage to move the latter the required distance.

According to the present invention power from the electric motor is stored, and utilized to trip the actuator stopping means, to engage the main clutch, and to engage the direction determining clutch of the carriage shifting means. Thus the only load on the carriage shifting keys will be that necessary to release the power storing element or hammer and to adjust certain elements to determine the direction.

For this purpose, the right and left shift keys are provided with links 400 engaging an arm 401 of transverse shaft 402, so that depression of the right shift key will rock said shaft in a counter-clockwise direction as viewed in (Fig. 5), while depression of the left shift key will rock shaft 402 in a clockwise direction.

At the left-hand side of the machine, shaft 402 is provided with a coupling connection 403 with a setting member 404, mounted loosely on shaft 402. Clockwise or counter-clockwise movement of member 404 will operate hammer releasing means hereinafter described and will also set the direction determining means as follows:

Slide 405, which engages the shipper arm 65 controlling the right and left carriage shifting clutches, is connected with a slide 406, lying to the rear thereof, by means of a latch 407. Slide 406, as related to the right and left carriage shift keys, may be regarded as stationary, since it is normally held in forward projected position by means of the automatic division lever. Latch 407, therefore, serves to hold slide 405 in position against the tension of shipper arm spring 316. When the left shift key is depressed latch 407 is raised by contact therewith of a roller upon arm 408 of member 404, this breaking the connection between slide 405 and 406, and allowing the former to be moved rearwardly and clutch hub 61 to be brought into engagement with clutch member 63.

When the right shift key is depressed, the roller on arm 408 will lift arm 409 of a compound lever 410, so that tooth 411 of said arm will engage with a lug 412 of slide 405. Upon operation of hammer 413, a pin 414 of said hammer will engage an arm 415 of lever 410, and through the engagement of parts 411, 412, will push slide 405 forwardly to bring clutch hub 61 into engagement with clutch member 62 of carriage shifting shaft 46.

Slide 405 will be returned to normal position, from either above-described active position by means hereinafter described.

Hammer 413 is operated by spring 416, normally held under tension by means of a bolt 417, slidably mounted in the machine frame. Member 404 has slot and pin connection 418 with a pivoted member 419 having a duplicate cam projection 420. A pin 421 of bolt 417 engages normally between the two cams of projection 420, these cams upon movement of member 404 serving to move bolt 417 endwise to release hammer 413 therefrom. Upon release of the hammer and operation thereby of lever 415, a pin 422 of said lever, striking arm 423 of coupling member 403, will release member 404 from connection with the depressed key. Member 404 being released, will be centralized by a spring 424. Bolt 417, however, will be held out of restraining position by contact with a flange 425 of hammer 413, until the hammer is restored to normal position whereupon bolt 417 will again engage the shoulder of said flange, to lock the hammer.

Pivoted upon hammer 413 is a plate 426 having sliding engagement with a pin 427 of the machine frame, said plate being provided with a pin 428 engaging a slot on lever 429. Lever 429 is provided with a cam extremity 430 engaging a roller upon lever 136, said lever having a link connection 137 with the actuator stop or locator arm 200.

Operation of the hammer by spring 416 will thus serve to raise the lock arm 200 and release the actuating mechanism and carriage shifting devices connected therewith. Plate 426 is also provided with a pin 431 engaging a lever 432 provided with a cam portion operating a roller 433 on the trigger member 31 of the stopping means. By this connection the actuating and carriage shifting means will be stopped and returned to normal position as previously described. A third pin 434 on plate 426 operates a lever 435 adapted to contact with and move the clutch yoke 111 into engaging position, so that the actuators and carriage shift members are connected with the motor drive.

The carriage shifting impulse will be transmitted as previously described, the accompanying forward movement of arm 24 being utilized to reset slide 405 and hammer 413, by means of a pin 436 contacting with said hammer and with a resetting slide 437. Slide 437 is employed to push slide 405 forwardly, from left-hand shifting position, allowing latch 407 to fall into place in front of slide 406. Slide 437 engages slide 405, through pivoted members 438 and 439.

When slide 405 has been adjusted to forward, or right-hand position, it will be restored by spring 316 upon return movement of hammer 413, lever 415 and member 409.

In order to prevent the machine from being set to shift in a given direction when the numeral wheel carriage 2 is already in the corresponding extreme shifted position, levers 440 and 441 are provided, these levers having lugs 442 adapted to be engaged by member 443 of the numeral wheel carriage. Thus when carriage 2 lies in extreme right-hand position lever 441 will engage in front of a pin 444 of arm 408 and will prevent depression of the right-hand shift key. Similarly, when the carriage lies in extreme left-hand position lever 440 will be positioned in rear of pin 444 to prevent depression of the left-hand shift key.

I claim:

1. In a calculating machine having a numeral wheel carriage, a motor, carriage shifting mechanism including a train of mechanism connected to said motor and including right and left shifting elements, a device engaging said carriage, a clutch between one of said elements and said device, and a clutch between the other element and said device; two keys, and means operable by the motor and controlled by said keys to engage a given clutch upon depression of a given key.

2. In a calculating machine having a numeral wheel carriage a motor, carriage shifting mechanism including a train of mechanism between said motor and said carriage, a main clutch in said train, releasing means for said clutch and direction-controlling clutches interposed in said train; two keys and means energized by said motor and controlled by said keys to engage the main clutch, to set the releasing means and to engage a direction-controlling clutch.

3. In a calculating machine having a numeral wheel carriage, a motor, carriage shifting mechanism including a train of mechanism between said motor and said carriage, a main clutch in said train, releasing means for said clutch, and direction-controlling clutches interposed in said train; two keys, and means operable to engage the main clutch, to set the releasing means and to engage a direction-controlling clutch, including a normally restrained element energized by said motor, and means common to the keys and operable to release said restrained element.

4. In a calculating machine having a numeral wheel carriage, a motor, and differential right and left carriage shifting mechanism operable by said motor; a key controlling right-hand shifting operation of said mechanism, a key controlling left-hand shifting operation of said mechanism, a member selectively operable by said keys, and means selectively adjustable into the path of said member to prevent depression of a given key when the carriage lies in a given extreme shifted position.

Signed at Orange, in the county of Essex and State of New Jersey, this 20th day of Sept., A. D. 1930.

LEE R. BROWN.
AUSTIN A. OVERBURY.